Figure 1A:
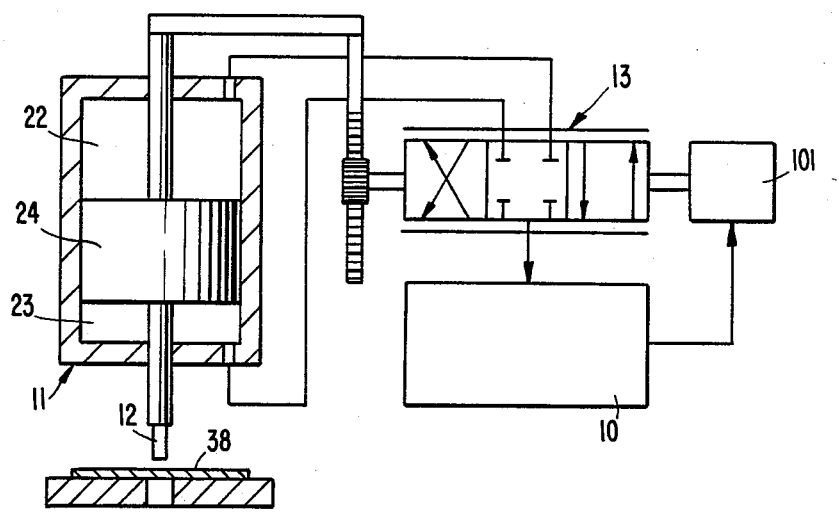

United States Patent [19]

Schulze

[11] Patent Number: 4,907,435
[45] Date of Patent: Mar. 13, 1990

[54] SYSTEM FOR MONITORING THE POSITION OF A MACHINE COMPONENT

[76] Inventor: Eckehart Schulze, Stahlbühlstrasse 36, D-7251 Weissach, Fed. Rep. of Germany

[21] Appl. No.: 315,717

[22] Filed: Feb. 27, 1989

Related U.S. Application Data

[63] Continuation of Ser. No. 921,611, Aug. 20, 1986, abandoned.

[51] Int. Cl.⁴ .............................. B21J 9/20
[52] U.S. Cl. ........................... 72/21; 72/19; 364/476
[58] Field of Search ............... 72/21, 22, 8, 9, 11, 72/12, 19; 364/476; 100/99; 83/74

[56] References Cited

U.S. PATENT DOCUMENTS

| | | | |
|---|---|---|---|
| 4,148,203 | 4/1979 | Farazandeh et al. | 72/21 |
| 4,208,895 | 6/1980 | Grigorenko et al. | 72/21 |
| 4,510,570 | 4/1985 | Yonekura | 72/21 |
| 4,692,857 | 9/1987 | Chi | 72/21 |
| 4,819,467 | 4/1989 | Graf et al. | 72/21 |

FOREIGN PATENT DOCUMENTS

| | | | |
|---|---|---|---|
| 0948515 | 8/1982 | U.S.S.R. | 72/21 |
| 1082536 | 3/1984 | U.S.S.R. | 72/21 |
| 1171171 | 8/1985 | U.S.S.R. | 72/21 |
| 1175632 | 8/1985 | U.S.S.R. | 72/21 |

*Primary Examiner*—David Jones
*Attorney, Agent, or Firm*—Antonelli, Terry & Wands

[57] ABSTRACT

A system for monitoring the position of a machine component, provided with an electrohydraulic drive system which, in order to control the forward and backward movements of this machine component, comprises a follow-up adjusting valve that operates with an electrically-controlled indication of the set value and with a mechanical announcement of the actual position. The monitoring system is provided with a mechanical conversion device which converts the deflections of the servocomponent of the follow-up adjusting valve into larger deflections, correlated therewith, of the mechanical operating element of a proximity switch which, seen in the deflection direction of its operating element, is arranged at a defined distance in relation to the position adopted by the operating element when the servocomponent of the follow-up adjusting valve is located in its characteristic basic setting for equivalence of the set and actual value. The proximity switch envisaged is a Hall generator, into whose field aperture projects the edge of a switching arm which can be driven rotationally by the deflection movements of the servocomponent of the follow-up adjusting valve.

11 Claims, 4 Drawing Sheets

SYSTEM FOR MONITORING THE POSITION OF A MACHINE COMPONENT

This is a continuation of application Ser. No. 921,611, filed Aug. 20, 1986, now abandoned.

The invention relates to a system for monitoring the position of a machine component, e.g. a machine head, which, in the course of machining a workpiece is carrying out feed and working stroke motions directed towards the workpiece, and return motions in the opposite direction. For the course control of these motions an electro-hydraulic driving apparatus is provided which comprises a follow-up control valve that operates with an electrically-controlled presetting of the desired positional values and with a mechanical indication of the actual positional values.

In hydraulically driven machines in which the operational motions of a tool are controlled by follow-up control, due to that kind of motion control, a monitored actual value which, e.g. mechanically indicated, is retarded relative to the electrically preset value of the desired position of the tool with respect to the workpiece, by a follow-up control error $\Delta s$. Therefore, in such machines it is normally required to provide for a monitoring system which recognizes whether and/or when the tool has reached a defined position, either with the object of checking that the tool has carried out its working stroke or with the object of precisely monitoring the end point of its working stroke when the machining result is sensitively dependent on an actual attainment of a defined end position as it is, e.g. in the operation of pressing and stamping machines.

In periodically operated stamping or punching machines, however, the working cycles of which should be carried out at repetition frequencies as high as possible, it will be sufficient under normal circumstances to monitor a tool position, after the attainment of which it may be assumed as certain that the tool has carried out its complete working stroke.

With the object of such monitoring it is well-known to use end position switches which can be switched over by an actuating element which is carrying out the same movements as the tool.

Such end position switches, however, require precise positional adjustment, and, depending on the constitution of the workpiece and of the tool, itself, precise adjustability to different strokes makes monitoring by end position switches difficult.

In addition, after longer times of use, the response characteristics of end position switches may change and readjustment may become necessary even though the machine is continuously operated with the same tool and is used to machine the same kind of workpieces.

Furthermore, if working at low values of the control circuit amplification is required, undesired long cycle times are often inevitable, since it is necessary to wait until, after a long regulation time resulting from the low control circuit amplification, the tool reaches its dead center of its working stroke which is best-suited for a monitoring by means of an end position switch.

Now, it is the object of the invention to provide a system of the type described above which ensures a simple and precise adjustment of the tool position to be monitored, and which enables a considerable reduction of the working cycle times when the tool carries out its forward and backward motions in periodically repeated working cycles and at high repetition frequencies.

This object is achieved according to the invention by monitoring the distance of the valve actuating element from its basic position and by triggering a position characteristic output signal of a proximity switch when the monitored distance falls below a defined minimum value indicating thereby that the tool is approximating its dead center.

The monitoring system acorrding to the invention offers the advantage that its adaption to strokes to be carried out by the tool is possible with very high accuracy by electronically controlled suitably chosen preset desired values of end positions, and without any complicated setting or adjustment procedures.

To adapt the system to a defined stroke of the tool and to a defined material thickness or deformation depth of the workpiece, respectiveley, it is merely necessary to adequately program the electronic presetting device, with the best-suited presetting values being easily obtainable by carrying out a few test cycles.

By proper selection of a sufficiently high transmission ratio according to which displacements of the valve actuating element are transformed into, e.g., rotational deflections of the actuating member of the proximity switch, a high sensitivity of the monitoring system with respect to alterations of the position of the valve actuating element and also a high precision of the monitoring of the actual position are achieved in a simple manner.

If presetting of the desired values is controlled in such a manner that an end position is preset which is beyond the position that must be reached by the tool, and that further the proximily switch is adjusted to generate its actual position indication signal just before the tool has performed its necessary working stroke, and that thereafter the indication signal is used to trigger presetting of the desired values correlated with the return movement of the tool, then, regulation times, so to speak, can be cut-off, which otherwise would pass until the tool would have reached the preset position and which had to wait to the end.

This is of particular advantage for periodically operated machines as it is possible to considerably reduce the cycle times and to thereby improve the efficiency of a machine equipped with a monitoring system according to the invention.

A monitoring system according to the invention, by which precise attainment of an end position of the tool is to be monitored, as it is required for pressing machines and stamping machines, respectively, may be controlled with respect to the presetting of desired values also in such a manner, that a desired value which is correlated with a larger stroke compared with the stroke that is actually to be carried out, is preset, and that as soon as the actual position characteristic signal of the proximity switch indicates that the tool has attained a position in immediate proximity to that position which is correlated with a desired deformation of the workpiece, the preset desired value is set to that position. In this manner, too, reduction of the cycle times required for carrying out the working stroke may be achieved.

The basic structure of a proximity switch is defined which allows it to be used within a system according to the invention and which may be accomplished by means of a Hall generator as the switching element, or alternatively by means of one or more light barriers.

The arrangement of the proximity switch offers the advantage that the proximity switch may be adapted in a simple manner to the flow characteristics of differently designed follow-up control valves.

Further, favourable applications of a system according to the invention are disclosed which are of particular advantage in view of a reduction of working cycle times.

Figure 1B:
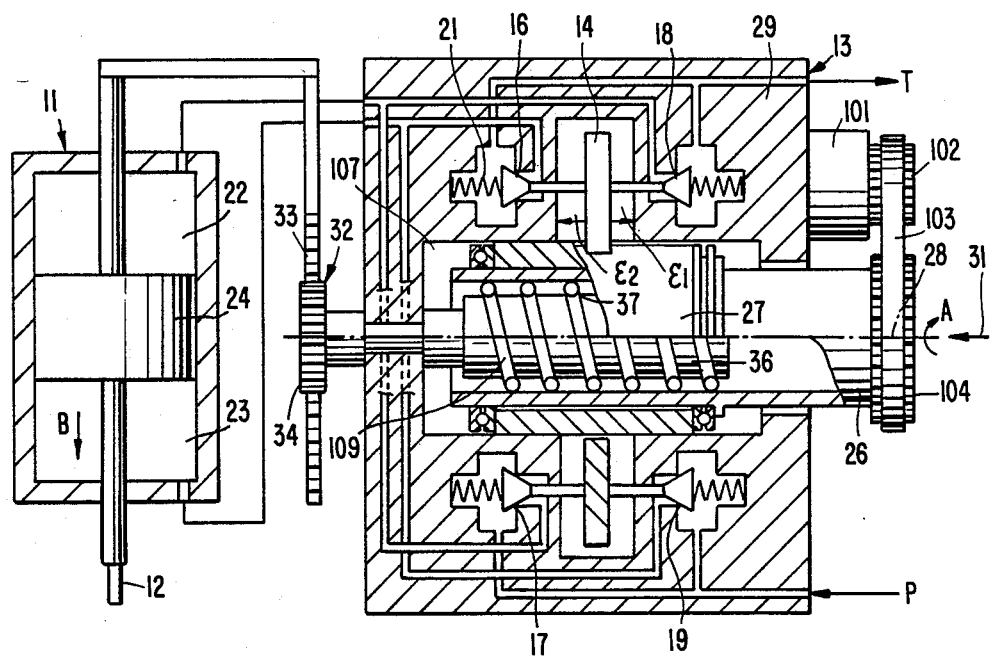
Figure 2:
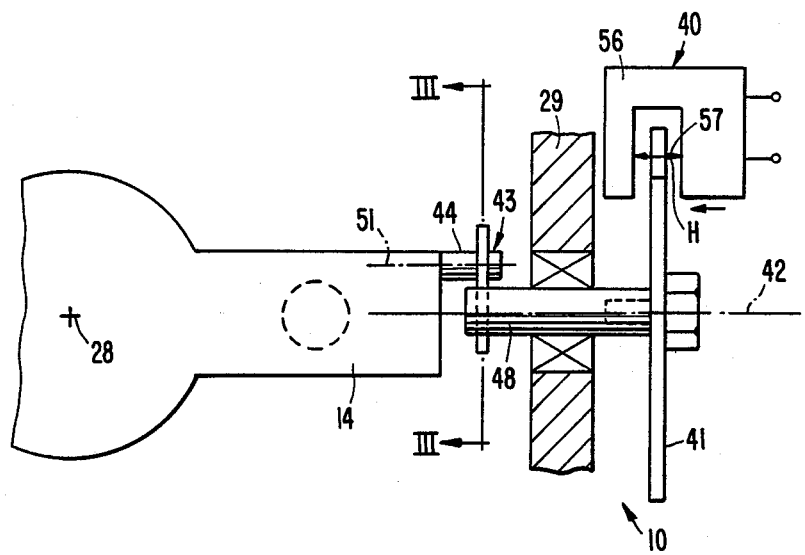
Figure 3:
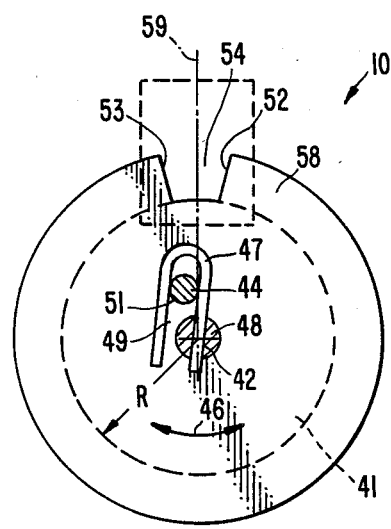
Figure 4:
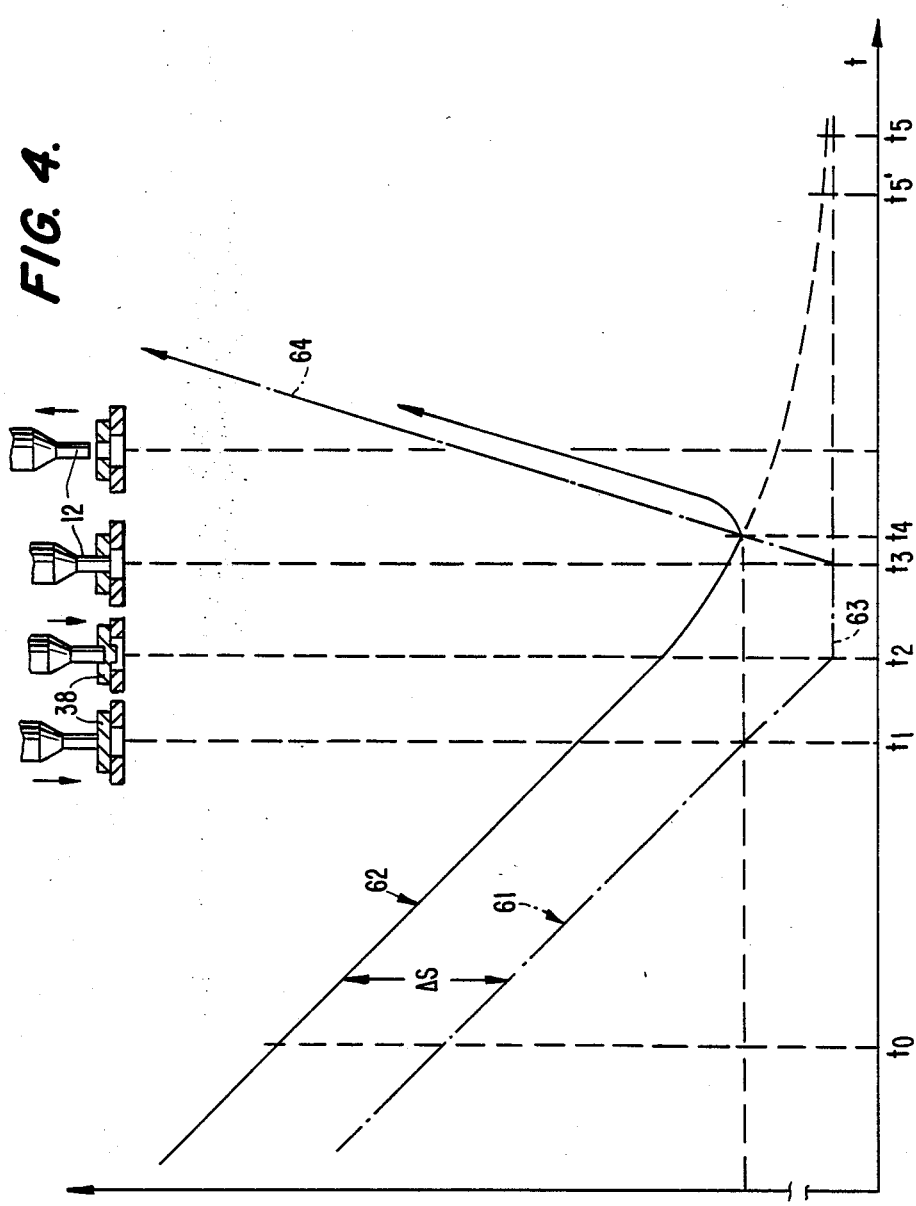
Figure 5:
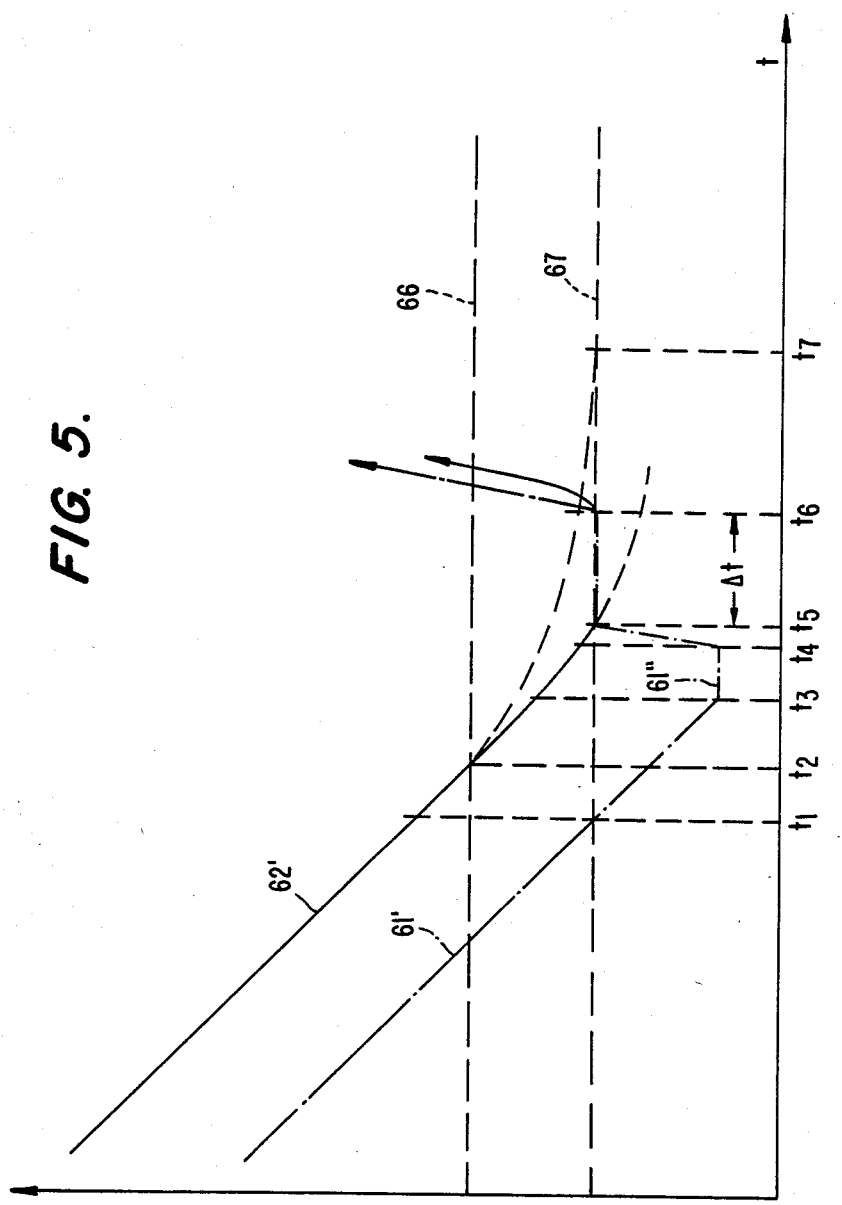

Further details and features of the invention will become apparent from the following description of a preferred embodiment of a monitoring system according to the invention with reference to the drawings in which:

FIGS. 1a and 1b show a block diagram of a follow-up controlled electro-hydraulic driving arrangement comprising a system according to the invention for monitoring the position of the valve actuating element of a follow-up control valve provided within the follow-up control circuit, and the basic structure of this follow-up control valve, FIG. 2 shows a simplified schematic view of the monitoring system according to the invention, provided within the driving arrangement according to FIGS. 1a and 1b FIG. 3 shows the monitoring system of FIG. 2 partially in section along line III—III of FIG. 2, and FIGS. 4 and 5 are diagrams explaining functional properties of the monitoring system shown in FIGS. 2 and 3

To explain the system, according to the invention and shown in FIGS. 2 and 3, for monitoring the actual position of a tool, e.g. a stamping tool or a pressing tool, at first reference is made to FIGS. 1a and 1b in order to examplify possible applications of the monitoring system 10 according to the invention.

Within a stamping machine, e.g. a so-called punching machine which is schematically represented by merely a double acting cylinder 11 and a stamping tool 12, and which is operating in periodically repeated stamping cycles, with the object of controlling a rapid feed motion, a working cycle, and a rapid return motion, an electrohydraulic follow-up control valve, generally designated by 13 of a kind well-known per se is provided that operates with an electrically-controlled presetting of desired positional values and with a mechanical feedback of the actual positional values.

As far as it is deemed necessary for an explanation of the system 10 according to the invention, the basic structure of this follow-up control valve 13 is shown in FIG. 1b, to the details of which reference is now made.

The follow-up control valve 13 is designed as a 4/3-way directional control valve comprising four valve-insets which have control edges which are individually adjustable.

In the embodiment as shown, the valve insets are designed as poppet valves 16, 17, 18 and 19 with frusto-conical valve bodies; by axial displacement of the valve actuating element 14, these valves can be controlled in pairs into an open or flow position against the action of restoring springs 21.

It is understood that instead of poppet valves, piston valves may be used as well. In alternate flow positions of the follow-up control valve 13 caused by actuation of one set 16, 17 or the other set 18, 19 of the valve insets, the two working chambers 22 and 23 of the double acting cylinder 11 are alternately connected to the high pressure output P and to the tank T, respectively, of a hydraulic pressure supply unit.

In the representation of FIG. 1a a first flow position of the follow-up control valve 13 is correlated with the rapid feed motion and with the working stroke of the stamping tool, whereas a second flow position is correlated with the rapid return motion of the stamping tool 12 and the piston 24 of the driving cylinder 11, respectively.

The desired values presetting control by the timed sequence of which also a tool speed control is provided, occurs by stepping motor 101 through a toothed gear 102, toothed belt 103 and gear 104, as hereinafter explained rotation of a spindle nut 26 fixedly associated with the gear 104 which is driven by the toothed gear 102 through the toothed belt 103 which is rotatably arranged within a sleeve 27, which, along the central longitudinal axis 28 of the valve housing 29, is axially displaceable in the forward and backward direction wihtin said housing but which is secured against rotational s 28 of the valve housing 29, is axially displaceable in the forward and backward direction wihtin said housing but which is secured against rotational movements relative to said housing 29 by virtue of the valve actuating element 14 which is constrained to move axially along axis 28 by housing 29.

The valve actuating element 14 is connected to sleeve 27 and is axially displaceable therewith. In the represented basic or neutral position of the follow-up control valve shown in FIG. 1b, each one of the poppet valves is in its shut-off position. By clockwise rotation A of the spindle nut when looking in the direction of arrow 31, the valve actuating element is subject to a displacement $\epsilon_1$, according to FIG. 1b to the left, whereby the two poppet valves 16 and 17 are brought into an open position, thereby the upper working chamber 22 of the driving cylinder 11 is connected to the tank T of the pressure supply unit, not shown. These valve positions correspond to the first control valve position in which the piston 24 is moving "downward".

When the spindle nut 26 is rotated in the counter-clockwise direction, the valve actuating element 14 is subjected to a displacement $\epsilon_2$, according to FIG. 1b to the right, and thereby the follow-up control valve 13 is brought into its second flow position which is correlated with the return movements of the driving cylinder 11.

The actual value feedback of the position of the piston 24 of the driving cylinder 11 and of the stamping tool 12, respectively, which is driven by said cylinder 11 is effected by means of a rack-and-pinion gear, generally designated by 32, whose rack is subjected to the same movements as the piston 24 of the cylinder 11, and whose pinion 34 is rigidly connected with a feedback spindle 36 which is not displaceable in the axial direction within the housing 29 of the follow-up control valve 13. The sleeve 27 moves relative to the nonaxially displaceable feedback spindle 36 by virtue of a track and ball arrangement within the chamber 107. Balls 37 are provided in tracks 109 to also minimize friction between the spindle nut 26 and the feedback spindle 36.

In the embodiment as shown, the feedback spindle 36 engages an internal track of the spindle nut 26 via balls 37. The follow-up control valve 13 as explained so far with respect to its construction provides for the function that the rotations of the feedback spindle 36 induced by the rack-and-pinion gear result in axial displacements of the valve actuating element 14 which have the opposite direction to displacements of the spindle nut 26 resulting from presetting of desired positional values with the consequence that the valve actuating element 14 takes its basic position shown in FIG.

1b when the desired position value equals the actual position value. The system 10 for monitoring the desired and actual values of the position of the tool 12 has the property that it is sensitive to an attainment of the basic position of the valve actuating element 14 and just responds to a position of the valve actuating element 14 which is taken by that element when the tool 12 has still a defined separation from its end position which is characteristic of the termination of a working cycle.

To explain the structure of the system 10 for monitoring desired/actual positional values, reference is made now to the details of FIGS. 2 and 3.

The basic structure of the monitoring system 10 according to the invention is that of a proximity switch which generates a characteristic signal when the valve actuating element 14, after having been displaced from its basic position—through the action of the presetting control—by a short distance $\epsilon_1$ or $\epsilon_2$, respectively, subject to a follow-up control error $\Delta s$, again returns to its basic position which is, e.g., the case in the final stage of the working stroke after termination of the presetting procedure of the working stroke control.

In this operational stage after stopping the stepping motor 101 the driving cylinder piston 24, within a regulation time T which is determined in a known manner by the circuit amplification Kv of the follow-up control circuit according to the relation $$T = \frac{1}{Kv} + \frac{1}{Kv}\left(\ln\frac{\Delta s}{\Delta x} - 1\right),$$

gradually approximates a defined position determined by the final preset end position value, wherein by $\Delta X$ a tolerable positioning error designated which is still exists after the regulation time interval T, this positioning error being smaller than the step-widths of the presetting procedure.

Due to a reduction of the circuit amplification when the driving system is switched over from rapid feed motion to—slower—working stroke motion, the regulation time T may be very long in practical cases and in extreme situations the regulation time T may be a multiple of the total time otherwise required for a high speed feed motion and for a working stroke of the stamping tool.

To avoid the necessity of waiting to the end of the regulation time T when the tool 12 has carried out its working stroke, e.g. by punching through the workpiece, provision is mede within the monitoring system 10 that the proximity switch 40 generates an output signal, by which the driving system 11, 13 is switched over from working stroke operation to rapid return motion, before the valve actuating element 14 has reached its basic position which would be characteristic of equality of desired and actual position, i.e., when the valve actuating element 14 has still a small separation from its basic position corresponding to, e.g., a fraction of the maximum value of the displacement $\epsilon_1$ or $\epsilon_2$ respectively.

In the embodiment according to FIGS. 2 and 3, the actuating member of the proximity switch 40 is a circular disk 41 rotatably arranged in the housing 29 of the follow-up control valve 13 around an axis 42 which extends perpendicularly to the longitudinal axis 28 of the follow-up control valve 13 along which displacements of the valve actuating element 14 occur. In the representation of FIG. 2 this longitudinal axis 28 extends normally to the plane of drawing.

The valve actuating element 14 is coupled to the actuating member 41 of the proximity switch 40 by means of a finger coupling 43 whose finger 44 is arranged a lateral distance from the rotational axis 42 of the actuating member, thereby displacements of the valve actuating element 14 are transformed into rotational deflections of the disk 41, which occur in the direction of arrow 46 of FIG. 3.

The coupling element 47 which is arranged at the disk 41 is a U-shaped bow made of spring steel, one leg of this bow 47 being inserted into a radial bore of the shaft 48 of the disk 41. The engagement between the bow 47 and the finger 44 of coupling 43 is free of play, the bow 47 bordering an oblong hole 49 which enables movements of the finger 44 relative to the disk 41 when the disk is rotating.

In a typical design the radius R of the disk 41 is about five times larger than the distance of the axis 42 of the shaft 48 from the central axis 51 of the finger 44 of coupling 43. That means that the rotational deflection of edges 52 and 53 of a peripherally open recess 54 of the disk 41, measured along its periphery is five times larger than the axial displacements $\epsilon_1$ and $\epsilon_2$ of the valve actuating element 14. This transmission ratio assumes that the proximity switch 40 responds to angular deflections of the edges 52 and 53 within a range of 0.5 mm, and the position of the valve actuating element 14 can be measured by means of the proximity switch with an accuracy of 1/10 mm.

In one embodiment the proximity switch 40 comprises a Hall generator 56 whose working magnetic field H, into which the peripheral edge 58 is projecting, is transversely directed to the disk 41 as visualized by arrow 57. It is assumed that the output signal of the Hall generator 56 is a high-level signal when the peripheral edge 58 is within the range of the magnetic field 57, and a low-level signal when the recess 54 of the disk 41 has entered the magnetic field 57. With respect to the radial mid-plane 59 of the disk 41 the edges 52 and 53 of the U-shaped recess 54 are arranged in a symmetric configuration such that in both possible directions of rotation of the disk 41 a change of the level of the Hall generator output signal is correlated which equal separations of the valve actuating element 14 from its basic position, seen in both alternate directions of displacements $\epsilon_1$ und $\epsilon_2$.

It is understood that, depending from the application of the monitoring system 10, the recess may be shaped in such a manner that the proximity switch 40 generates output signals which are correlated with different separations of the valve actuating element 14, dependent upon alternate directions along which the valve actuating element 14 is approximating its basic position.

Instead of a disk with a radially open recess 54 it is also possible to use a cam disk with a radially protruding vane.

Instead of a Hall generator it is further possible to use a light barrier whose light flux can be interrupted either by the peripheral edge 58 of the disk 41 or by a radial vane. Furthermore inductive or capacitive proximity switches may be used within a monitoring system 10 according to the invention.

In the following description reference is made to the diagram of FIG. 4 to explain typical funtional properties of a monitoring system used, e.g., within a stamping machine operating in periodically repeated working cycles.

In the diagram of FIG. 4 it is assumed that the downward movement of the tool 12 which is directed towards the workpiece 38 and which was initiated as a rapid feed motion has been changed over—before time $t_0$—into the working stroke in which the tool is moving at lower speed but the driving power is increased as is necessary for punching through the workpiece 38.

The actual positions of the tool 12 whose temporal development is represented in FIG. 4 by the continuous curve 62, and the temporal sequence of the desired values represented in FIG. 4 by the dask-dot presetting curve 61, then differ by a follow-up retardation error $\Delta s$ according to the relation $\Delta s = v/K_v$ wherein v is the velocity of the tool motion and $K_v$ is the so-called circuit amplification of the follow-up control circuit. It is assumed that the retardation error $\Delta s$ is nearly equal to the thickness of the workpiece 38.

At first the stamping tool 12 is moving with constant velocity towards the workpiece 38 contacting at time $t_1$ its upper surface.

At this time $t_1$ the preset desired positional value is just corresponding to the complete working stroke, i.e. if the actual position would correspond to the desired position, the tool 12 would just have perforated the workpiece 38 and the stamping edge of the tool 12 would extend in the plane of the lower surface of the workpiece 38.

By the continued presetting of lower desired positional values, however, a further downward movement of the tool 12 is programmed which corresponds to an end-position 63 below the workpiece 38. By this kind of presetting control, so to speak, a position below the workpiece is aimed at, and it is attained that the driving system is propelling the tool with full power into the workpiece 38. Beginning at time $t_2$ the preset desired position is kept at a constant value which corresponds to an end position of the tool 12 below the workpiece 38, that means a position which the tool 12 finally would reach after a relatively long time interval at time $t_5$ since beginning at time $t_2$ the the velocity of the tool 12 at which it moves towards the preset end position decreases exponentially. The monitoring system 10 is adjusted in such a manner that the output signal level of the proximity switch 40 is changed as soon as the tool 12 has penetrated through the workpiece 38 which is the case at time $t_3$. Beginning at time $t_3$ the presetting control device is programming a backward motion of the tool 12 as represented by the rising branch 64 of the curve 61, when at time $t_4$ equality of desired value and preset value being attained.

Due to the actual position feedback effected by the monitoring system 10 which recognizes that the workpiece 38 is perforated, i.e. that the tool 12 has performed its working stroke, it is possible to initiate immediately thereafter the retracting movement of the tool 12. It is not necessary to wait until the tool 12 has reached a preset position but the regulation time T is, so to speak, "cut-off", and it is achieved that the tool 12 may reach its upper end position from which it starts to carry out the next working cycle, just at a time $t_5$, e.g. at which otherwise its lower end position would have been reached.

The presetting procedure and actual position feedback as explained so far are of particular advantage when the working cycles of the tool 12 are to be carried out periodically and within time intervals of shortest-possible duration, as it is required e.g. for punching machines, i.e. in applications where it is not of substantial importance to know the time at which a defined position is reached but to know that a position which ensures performance of the working stroke has been passed.

The monitoring system 10 according to the invention, however, may also be used to control at which time a defined position required to achieve a desired result is attained, i.e. when a working stroke beyond which the tool 12 must not be moved is performed. In such an application the monitoring system 10 is adjusted in such a manner that the position characteristic output signal of the monitoring system 10 is triggered when the tool has performed the major part of its working stroke required to obtain a desired deformation of the workpiece so that it can be assumed that, within the above explained regulation time T, the tool 12 will reach the end-position which corresponds to the preset desired value. In such a case the monitoring system 10 is adjusted in such a manner that the change of the output signal level, seen in the representation of FIG. 4. occurs not before the time $t_5$, when the tool 12 has just reached a position which practically corresponds to the desired endposition.

Finally reference is made to FIG. 5 to explain an additional application or mode of operation of a monitoring system 10 according to the invention which, when used to control pressing or stamping strokes, also enables a considerable reduction of the time interval which elapses until a working stroke effecting a desired deformation of a workpiece is terminated. As an example it is assumed that a deep-drawing sheet steel shall be pressed into a predetermined form.

FIG. 5 shows in a diagram analogous to that of FIG. 4 in dash-dot lines 61' the temporal development of the preset positional values, and in continuous lines 62' the temporal development of the actual positions of the pressing tool.

In FIG. 5, by a straight line 66 extending parallel to the time axis—the abscissa of the diagram—that position of the pressing tool is marked in which the tool, coming from above and carrying out the working stroke, contacts the workpiece which is assumed to occur at time $t_2$. By a second straight line 67 extending parallel to the abscissa the end position is marked which the tool must reach to obtain a desired permanent deformation of the workpiece.

It is at time $t_1$ that the preset value, represented by curve 61', corresponds for the first time to that position to be reached. Presetting control is, as just explained with respect to FIG. 4, continued beyond times $t_1$ and $t_2$ in the sense of larger strokes until at time $t_3$ a preset value "below" the required position is reached.

From actual position curve 62' it may be seen that it is ensured that at time $t_3$, the tool has not yet reached the required final position. Beginning at time $t_3$ the preset value is kept constant as represented by section 61" of curve 61'. At time $t_4$, at which the tool is a very short distance from its required end position, the proximity switch 40 responds and triggers a resetting of the desired position to that value which corresponds to the required final value, represented by the straight line 67, at time $t_5$ the preset desired value corresponding to the required value. At time $t_5$ the desired value and the actual value are practically identical, beginning at time $t_5$ the preset value being kept constant at value 67.

After a time interval Δt which is considerably shorter than the regulation time resulting when, beginning at t₁ the preset value would have been kept constant at the required value 67 in which case the tool would reach the required position not before time t₇, the working cycle may be assumed as accomplished just at time t₆ and the return motion of the tool may be initiated at t₆.

By this mode of operation of the monitoring system 10 considerable shortenings of pressing and stamping cycles may be achieved.

I claim:

1. A system for monitoring positions of a machine tool component which carries out feed motions toward a workpiece and return motions away from the workpiece and for coarsely controlling the feed and return motions, comprising:

a hydraulic driving means for effecting the feed and return motions;

monitoring means for electrically-controlled presetting of desired positional values for the component and mechanical feedback of actual positional values of the component; and a follow-up control apparatus operatively connected with the hydraulic driving means and the monitoring means, wherein valves are provided to be opened and closed to permit a pressure medium to be selectively delivered to the hydraulic driving means for moving the component in feed and return directions, valve actuating means for causing displacement of the valves in response to the preset desired values from a basic position in which the desired and actual positional values are the same to positions corresponding to the feed and return directions of the component, and proximity switch means having a deflectable actuating member for providing an output signal to said monitoring means, transmission means operatively coupled between said valve actuating means and said proximity switch means for transmitting displacements of said valve actuating means into deflections of the actuating member of said proximity switch means, the deflections being proportional to but larger than the displacements, said proximity switch means, when viewed in a direction of the deflection of the actuating member, is at a defined distance from a position occupied by the actuating member when said valve actuating means is in the basic position.

2. A system according to claim 1, wherein the actuating member is a vane rotatably drivable by displacement of said valve actuating means, the vane having a periphery provided with means for cooperating with a stationary portion of said proximity switch means to trigger the output signal.

3. A system according to claim 2, wherein the cooperating means is a recess.

4. A system according to claim 2, wherein the cooperating means is a projecting part.

5. A system according to claim 2, wherein the actuating member is displaceable along an axis of the follow-up control apparatus which comprises a housing, said housing accommodating a shaft having a finger-shaft element for operatively coupling the actuating member with the follow-up control apparatus, said shaft being rotatable about an axis extending orthogonally to the displacement direction of the actuating umber and having a projecting portion at which is mounted means for actuating said proximity switch means, said proximity means constituting a Hall generator, and said actuating means being ferromagnetic and movable through a working magnetic field of the Hall generator.

6. A system according to claim 5, wherein the actuating is a circular disk having a peripheral edge projected into a gap region which is traversed by the working magnetic field, the peripheral edge being provided with a recess which lapses through the gap region as said valve actuating means is at or is close to the basic position.

7. A system according to claim 5, wherein the actuating member is a sector-shaped cam having a peripheral edge projected into a gap region which is traversed by the working magnetic field, the peripheral edge being provided with a recess which passes through the gap region as said valve actuating means is at or is close to the basic position.

8. A system according to claim 1, wherein said proximity switch means has a stationary portion constituting a light barrier such that deflections of the actuating member transmit or block a light flux to trigger the output signal.

9. A system according to claim 1, wherein said proximity switch means is adjustable for generating the output signal proportional to an approximation of the basic position of said valve actuating means.

10. A system according to claim 1, wherein the machine tool component is a pressing member in a pressing machine, and said monitoring means monitors the attainment of a predetermined end position of the pressing member.

11. A system according to claim 1, wherein the machine tool component is a punch tool in a punching machine carrying out multiple working cycles, and said monitoring means checks that the punch tool has passed a defined position in each of the working cycles.

* * * * *